United States Patent Office 3,284,238
Patented Nov. 8, 1966

3,284,238
NOVEL GEL COMPOSITIONS AND METHODS FOR PREPARATION THEREOF
Malcolm L. White, Bethlehem, Pa., assignor to American Cyanamid Company, Stamford, Conn., a corporation of Maine
No Drawing. Original application Aug. 26, 1960, Ser. No. 52,014. Divided and this application Apr. 3, 1963, Ser. No. 270,153
2 Claims. (Cl. 136—86)

This application is a division of application Serial No. 52,014, filed August 26, 1960, to Novel Gel Compositions and Method for Preparation thereof.

The present invention relates to novel ion-exchange compositions and to membranes and diaphragms composed of or having a content thereof. The invention includes electrodialysis, ion removal, fuel cell combustions and similar operations performed by use of said compositions, the removal of dissolved ions from aqueous liquids, the production of electrical energy by reaction of normally combustible gases in a fuel cell, and in fact electrodialysis and ion exchange operations in general, generally depends upon the use of ion exchange material. Ion exchange sheets suitable for use as diaphragms in such operations have been prepared by incorporating particles of ion-exchange material in a film-forming matrix and then forming acid or amine groups on the external surfaces and internal interfaces of the product. These groups are hydrophilic, and decrease the resistivity of the product to a comparatively low value; cf. Wyllie U.S. Patent No. 2,820,756 (1958) and Bodamer U.S. Patent No. 2,921,005 (1960). The resistivity values of such film, however, are undesirably high.

Ion-exchange granules have been formed by bulk polymerizing ionic polymeric material and comminuting the resulting polymer, and by emulsion polymerizing a polymerizable ionic liquid to permit effective percolation of water. However, the granules must be fairly large, and in such instances the ratio of their surface area to volume is undesirably low.

The discovery has now been made that uniformly hydrophilic ion-exchange gels can be prepared and that these gels possess substantially lower resistivity values. It has been found that these gels can be prepared simply by forming an aqueous gellable solution having ion-exchange material distributed therein, and gelling the solution to water-insoluble state. The resulting gel contains the ion-exchange material in irreversibly occluded state useful for the purposes mentioned.

The invention does not depend upon the particular gellable solution used, and the components may be non-ionic or ionic.

The ion exchange material may be any of the previously-known ion-exchange resins in crushed or small bead form; or a water-insoluble liquid ion-exchange resin in emulsified form. It is a feature of the invention, however, that the ion-exchange resin may be a normally water-soluble polymer, in which event the resulting gel contains the soluble ion-exchange material in occluded, molecularly-dispersed state, so the product possesses high surge capacity, i.e., so that it possesses a high rate of exchange even when the ion content of the liquid being purified increases sharply.

The gels of the present invention and the methods thereof for their preparation in preferred embodiments possess the following advantages.

(1) The gels are uniformly hydrophilic so that they are permeable across their entire surface and their interior to water and to small ions. As a result of this and because they are predominantly water with typical contents of water in the range of 70%–90% by weight, the resistivity of the gels is lower than would otherwise be the case.

(2) The ratio of available ion-exchange surface to the volume of the ion exchange material is high, particularly when the ion-exchange component is normally water-soluble. In such instance the ion-exchange component is occluded in dissolved, i.e., in molecularly dispersed form so that the surface:volume ratio is at a maximum, and surface exhaustion of the ion-exchange material is minimized.

(3) The ion material being occluded is discretely present in the gel and therefore presents its maximum surface to approaching ions.

(4) The process permits the use of water-insoluble ionic liquids as ion-exchange agents in fixed beds. Up to the present this large class of substances has been used only in bulk emulsion form, in apparatus of complex design.

(5) The process permits the ion-exchange gel to be cast, so that membranes of intricate shape can be formed in inaccessible locations.

(6) The process permits the matrix and occluded ion-exchange material to be selected in each instance in view of the best physical and chemical characteristics of each. Thus if desired the matrix may be heat liquefiable and the occluded material a solid, so that the two can be readily separated and reprocessed.

The continuous phase of gels of the present invention is a normally water-soluble gellable material which has been gelled in aqueous medium to water-insoluble state. The continuous phase may be a natural material for example gelatin, cellulose (regenerated cellulose or agar-agar), or may be a synthetic gel. Suitable synthetic gels include those formed by cross-linking a normally water-soluble polymer to three-dimensional insoluble state, and thus include those formed by cross-linking polyacrylamide or polymethacrylamide with glyoxal, epichlorohydrin, diglycidyl ether, etc.

They further include the gels formed by reaction of polyacrylic acid in aqueous medium with chromic salts and those formed by cross-linking with epichlorohydrin the polyalkylenepolyamine formed by reacting diethylenetriamine with adipic acid.

In addition, the continuous phase may be the gel formed by polymerizing one or more water-soluble vinyl monomers in aqueous medium in the presence of a water-soluble cross-linking agent. Thus the phase may be formed by polymerizing acrylamide in water-solution in the presence of methylenebisacrylamide as cross-linking agent.

The continuous phase may thus be non-ionic (as when composed of gelatin). However, it may have cation- or anion-exchange properties, as when respectively prepared from an acidic or basic (amino) starting material, and this is often preferred as the product then possesses higher ion-exchange properties per unit weight.

The occluded ion-exchange material may be a water-soluble ionic polymer. For this purpose polymers having a molecular weight in excess of 2,000 are preferred as polymers of this size are retained better within the pores or molecular cells of the gel. The material may be a water-insoluble ionic liquid, and in this event molecular weight is not a determinant of retention as the liquid is present in emulsified state.

Finally the occluded ion-exchange material may be a water-insoluble solid polymer. The polymer may be in crystalline or amorphous crushed state or may be in the form of spheroids resulting from preparations of the material by an emulsion polymerization process. It is preferred that this material have a particle size of less than 10-mesh down to 250-mesh ($44\mu$) or finer (including the colloid range) as the smaller the particles the higher is the ratio of the surface of the particles to their volume, with consequent increase in the area of any given weight of ion-exchange polymer which is exposed to contact with ions.

The occluded ion-exchange material may be any of the materials heretofore employed for ion-exchange purposes, and it is within the scope of the invention to use mixtures of ion-exchange materials which may have the same or opposite ion-exchange properties. Suitable materials include the natural zeolites, synthetic zeolites such as synthetic coal and sodium aluminum silicate and synthetic ion-exchange materials, for example melamine-guanidine-formaldehyde resin, urea-guanidine-formaldehyde resin, quaternary ammonium polymers, phenolsulfonic acid-formaldehyde resins, and sulfonated polystyrene resin. In addition the commercial resins sold under the designation "Amberlite" are suitable.

The gels may be prepared in a number of different ways which differ in detail but possess the common feature of gelling an aqueous solution of gelable material having ion-exchange material uniformly distributed therein.

According to one method, a solution is formed of a preformed polymer (or mixture of polymers), the ion-exchange material is distributed therein, and the solution is gelled. Thus a natural zeolite (greensand) ground to 200-mesh may be slurried into hot gelatin solution and the solution cooled. A gel forms which occludes the greensand particles. In place of the gelatin, polyacrylamide may be employed and cross-linking may be effected by addition of glyoxal.

According to another method, a solution is formed of a polymerizable monomer (or mixture of monomers), ion-exchange material is added (with a polymerization catalyst if needed), and the mixture allowed to gel.

If desired, the polymerization may be performed in bulk so as form a cast column or other shape of ion exchange gel which can be used in that form. If desired, the cast polymer can be cut up to form discs, or can be chopped into small pieces to form a percolating bed. It is a feature of the invention, however, that it is easy to prepare ion-exchange diaphragms in accordance therewith. Such diaphragms are prepared by coating or impregnating a support (for example paper, cellophane, cloth, asbestos, nylon, netting, or metal screening) with the polymerizable material containing the ion-exchange component and placing the impregnated support material between Lucite plates until insoluble gel formation has come to substantial completion. The product is the base material carrying a continuous tough, leathery coating of hydrophilic gel having ion-exchange material occluded within.

Diaphragms which contain both cationic- and anionic-exchange material are ion-repellent and impede the passage of both cations and anions while permitting the passage of water and small non-ionic molecules therethrough.

The practical equivalent of distilled water results when ordinary water is stored for a few hours in contact with a mixture of gels according to the present invention of the cationic- and anionic-exchange types, or in contact with one gel containing both these resins.

It is within the scope of the invention to mix powdered ion-exchange material with viscose (cellulose xanthate) and to extrude the suspension in customary manner into a dilute sulfonic acid bath and thereby regenerate cellulose from the cellulose xanthate. The result is non-fibrous regenerated cellulose film having an occluded content of ion-exchange material. Such a film or sheet is physically weak and it is within the scope of the invention to extrude the solution upon cloth or metal screen as reinforcement.

The invention will be further illustrated by the following examples. These examples constitute embodiments of the invention and are not to be construed as limitations thereon.

Example 1

The following illustrates the preparation of a non-ionic hydrophilic water-insoluble gel having normally water-soluble ion exchange material uniformly and molecularly occluded within.

A gelable solution containing an anionic polymer is prepared by mixing 190 g. of acrylamide, 10 g. of methylenebisacrylamide, 100 g. of sodium polyvinyltoluenesulfonate having an estimated average molecular weight of 200,000, and 500 cc. of water.

To this are added with stirring, 4 g. of dimethylaminopropionitrile and 5 g. of ammonium persulfate as catalysts together with water to make up to 1000 cc. The resulting solution is viscous and lightly opalescent. Stirring is stopped, and the solution changes to a stiff, water-insoluble rubbery gel on standing for 10 to 20 minutes at room temperature.

The gel is removed and 100 cc. thereof is finely chopped into pieces roughly $\frac{1}{16}''$ square with a spatula. The particles are placed in a 250-cc. jar which is nearly filled with deionized water, and the jar is stoppered and allowed to remain at room temperature for three days with occasional shaking. At the end of that time a conductivity test on a removed sample of the water fails to detect more than a trace of acid in the water, showing that substantially all of the polymerized sodium vinyltoluenesulfonate is irreversibly occluded in the gel.

The cation-exchange capacity of the gel is determined by filling with finely chopped pieces of the gel with a cup 2" in diameter and 10" high having a porous bottom, eluting with excess weak aqueous hydrochloric acid to convert the occluded polymer to hydrogen (acid) form, washing the gel with distilled water to remove residual free acid, eluting with an excess of neutral sodium chloride solution, titrating the effluent to determine the amount of hydrochloric acid thereby formed, and from this calculating the ion-exchange capacity of the gel. The water content of the gel (continuous phase of the product) is 90%; the product has the satisfactory capacity of 3.7 milliequivalents per gram of product (dry basis).

In subsequent tests this gel was found to act as a perm-selective membrane and permitted the passage of sodium, potassium and tetramethyl ammonium ions while preventing the passage of chloride and other anions both large and small. The gel has a specific resistivity of 50 ohm-cm. in N/10 KCl.

Example 2

The following illustrates the preparation of a non-ionic hydrophilic water-insoluble ion-exchange gel having normally insoluble cation-exchange material uniformly occluded within.

A gelable solution is prepared in a wide-mouthed bottle by the method of Example 1 using 500 cc. of water, and to this is stirred an aqueous slurry of 400 g. of a commercial insoluble cation-exchange resin having a capacity of 5 me. per gram consisting essentially of the sodium salt of a partially sulfonated copolymer of styrene and divinylbenzene ground to pass through a screen having 100 meshes to the inch. Catalyst is added according to Example 1, and the suspension is made up to 1000 cc. with distilled water.

After 10 minutes the suspension forms a gel similar to that of Example 1, but is stronger and more rubbery.

The product has the satisfactory capacity of 3.0 milliequivalents per gram (dry basis) when tested by the method of Example 1, showing that the capacity of the resin is not substantially affected by the treatment to which it was subjected.

Example 3

The following illustrates the preparation of a hydrophilic water-insoluble non-ionic proteinaceous polymer which occludes a normally water-soluble cation exchange polymer.

In 70 cc. of hot water in a 250 cc. beaker are dissolved first 20 cc. of edible natural gelatin, and then 10 g. of the polyvinyltoluene sulfonic acid sodium salt used in Example 1. On cooling, the solution sets to a water-insoluble gel which possesses satisfactory ion-exchange properties, as determined by the method of Example 1.

Example 4

The following illustrates the preparation of a hydrophilic water-insoluble non-ionic proteinaceous polymer which occludes a water-soluble anion-exchange polymer.

The procedure of Example 3 is followed, except that the cation-exchange polymer is replaced by an equal weight of polyethylenimine, added as a viscous aqueous solution. A similar insoluble rubbery gel forms, the gel is removed, chopped into pieces with a spatula, and washed with 1% aqueous sodium hydroxide solution to convert the occluded resin to amine form. The chopped gel is placed in a beaker and covered with neutral sodium chloride solution. The solution becomes basic showing that the occluded resin possesses anion-exchange properties.

Example 5

The following illustrates the preparation of hydrophilic water-insoluble cation-exchange gel having normally water-soluble anionic material uniformly and molecularly occluded within.

The procedure of Example 1 is repeated except that the gelable solution contains only 180 g. of acrylamide and also contains 10 grams of acrylic acid.

The capacity of the product is 4.0 milliequivalents per gram (dry basis).

Example 6

The following illustrates the preparation of a non-ionic hydrophilic water-insoluble gel formed of a vinyl amide polymer complexed with chromium, having normally soluble anion-exchange material occluded within.

To 1000 cc. of a 5% by weight aqueous solution of polyacrylamide of an estimated melocular weight of 1,000,000 is added with stirring first 25 g. of neutral poly-N-methylpyridine hydrochloride and then 1.0 g. of chromic chloride, both as aqueous solutions. The pH of the resulting mixture is adjusted to 4. The mixture sets to a stiff rubbery gel and shows satisfactory capacity as an anion absorber.

Example 7

The following illustrates the preparation of a hydrophilic water-insoluble anion-exchange gel having a normally water-soluble anion-exchange material uniformly occluded within.

A gelable solution is prepared by mixing 283 g. (1 mol) of acrylamidopropylbenzyldimethyl ammonium chloride and 158 (1 mol) of methylenebisacrylamide in water, and adding 6 g. of dimethylaminopropionitrile and 8 g. of ammonium persulfate as catalysts. To this was added 220 g. of the water-soluble anion-exchange diethylenetriamine adipic acid-epichlorohydrin resin made by reacting 2.2 mols of diethylenetriamine with 1 mol of adipic acid at 185° C., reacting the product with 1 mol of epichlorohydrin, as shown in Keim U.S. Patent No. 2,926,154 (1960) and quaternizing with methyl chloride. The solution set to a gel while standing over a week-end and after washing with 1% sodium hydroxide solution displayed good anion-removal capacity as determined by the method of Example 1.

Example 8

The following illustrates the preparation of a hydrophilic water-insoluble ion-exchange gel having a different water-soluble anion-exchange material occluded within.

The procedure of Example 7 is repeated except that the anion exchange resin is the water-soluble product obtained by substantially completely reacting p-chloromethylstyrene with trimethyl amine.

Example 9

The following ilustrates a commercial wetting agent as the occluded phase of products of the process of Example 1.

The process of Example 1 is repeated except that the sodium polyvinyltoluenesulfonate used therein is replaced by an equal weight of the wetting agent formed by reacting formaldehyde with 2-naphthalenesulfonic acid to a molecular weight of 2,000–4,000.

The product has properties similar to those of the product of Example 1.

Example 10

The following illustrates the preparation of a permselective membrane comprising a water-insoluble gel having normally water-soluble cation-exchange material occluded therein.

A gelable solution is prepared according to Example 1, but containing polyacrylic acid in place of the sodium polyvinyltoluenesulfonate. A sheet of laboratory filter paper is saturated with the solution and is lightly pressed between two plates of polymerized methyl methacrylate until the solution gels. The resulting membrane has the limpness of wet paper, but has a leathery, slippery surface and is stronger than the dry paper from which it is made.

The membrane is oven dried for 5 minutes at 250° F. The gel is substantially dehydrated and the paper becomes stiff. The gel becomes rehydrated and the membrane returns to its limp per-selective form upon immersion in water at room temperature for 5 minutes.

Example 11

The following illustrates the preparation of a perm-selective membrane wherein an anion-exchange material is occluded.

The procedure of Example 10 is repeated except that the ion-exchange material is the quaternized, polymerized p-chloromethylstyrene of Example 8.

Example 12

The procedure of Example 1 is repeated except that the strongly ionized sodium polystyrenesulfonate is replaced by the weakly ionized sodium polyacrylate. A similar product is obtained which, however, possesses better selectivity for copper ions than for nickel ions.

Example 13

The procedure of Example 3 is repeated except that the gelatin is replaced by an equal weight of agar-agar. A similar product is obtained.

Example 14

The procedure of Example 10 is repeated using a mesh fabric (cotton marquisette containing about 10 threads to the inch) in place of the paper. A strong membrane is obtained which is free from pinholes.

Example 15

The following illustrates a hydrophilic water-insoluble gel having both water-soluble and water-insoluble ion-exchange material occluded therein.

The procedure of Example 1 is repeated except that along with the catalysts there is added with stirring the slurry of insoluble cation-exchange resin of Example 2.

The product resembles the product of Example 2 and has a capacity of 3.0 milliquivalents per gram.

Example 16

The following illustrates the preparation of a hydrophilic water-insoluble gel having a normally liquid, water-insoluble ion-exchange material occluded therein.

A gelable solution is prepared in a wide-mouthed bottle by the method of Example 1 using 500 cc. of water and to this is added with stirring 200 cc. of a 50% solids emulsion of disodium 2-ethylhexyl phosphate (a water-immiscible liquid cation-exchange material).

Catalyst is added and the emulsion is made up to 1000 cc. with water according to Example 1.

The product is a rubbery gel, milky in color, having colloidal droplets of the emulsified ion-exchange material occluded therein.

Example 17

The following illustrates the preparation of a water-permeable ion-impermeable membrane useful for desalting sea water.

The procedure of Example 2 is repeated except the slurry is composed of equal weights of commercial cation-exchange and anion-exchange resins ground to pass a 200-mesh screen. After addition of the catalyst solution, nylon mosquito netting is impregnated with the resulting mixture and placed between methyl methacrylate plates for 20 minutes. The product is a flexible nylon-reinforced membrane.

A part of the membrane is clamped over one end of 6" inside diameter glass tube, which is immersed to a depth of 10 feet in a cylinder of filtered sea water. Water of potable quality slowly accumulates in the tube.

Example 18

The following illustrates the preparation of a hydrophilic water-insoluble gel having a polymeric chelating agent occluded therein.

A gelable solution is prepared by mixing 190 g. of acrylamide, 10 g. of methylenebisacrylamide, 400 g. of insoluble chelating resin (made by copolymerizing chloromethylstyrene with divinylbenzene, reacting the copolymer with 2,2'-diacetonitrile, followed by acid hydrolysis of the reacted diacetonitrile) ground to pass a 100-mesh screen, and 500 cc. of water. To this is added with stirring 4 g. of dimethylaminopropionitrile and 5 g. of ammonium persulfate as catalysts together with water to make up to 1000 cc. Stirring is stopped, and the viscous slurry changes to a water-insoluble gel in 20 minutes. The gel is removed and chopped into pieces with a spatula.

A liter of a 10% solution of commercial alum

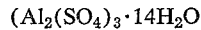

$(Al_2(SO_4)_3 \cdot 14H_2O$ containing 0.5% by weight of iron calculated as $Fe_2O_3$ based on the weight of the alum) is divided into two parts. To one part is added 5 g. of the above-described gel and the second part is left untreated as control. After 2 hours of standing both alum solutions are used to make rosin-sized handsheets using iron-free rosin size and laboratory demineralized water.

The handsheets made by use of the treated alum solution are brighter than the handsheets made by use of the untreated alum solution, showing that the brighter handsheets contain less iron rosinate than the other handsheets.

Example 19

The following illustrates a fuel cell containing a membrane according to the present invention.

A gelable slurry of 100-mesh insoluble partially sulfonated styrene-divinylbenzene copolymer cation-exchange resin is prepared by the method of Example 2. The slurry is allowed to gel between two methyl methacrylate plates 30 mils apart. A soft, rubbery slightly elastic, opaque sheet is obtained.

A fuel cell membrane-electrode assembly is made by cutting the gel coating to form a disc 3" in diameter, placing the disc between two 3" discs of 200-mesh platinum screen and stiffening each platinum screen disc with an overlay of stiff 10-mesh stainless steel screen. The assembly is gasketed between two stainless steel cups each having a gas inlet and a gas exit orifice. The cell is placed in operation by circulating hydrogen gas through one cup and oxygen through the other cup. The gases react at the electrodes with formation of water in the membrane. The cell has a power of 6.6 milliwatts.

Example 20

The following illustrates the preparation of a permselective membrane by occlusion of finely-divided ion-exchange material in paper by a hydrophilic water-insoluble gel.

A commercial ion-exchange paper as starting material is employed; it consisted essentially of paper carrying on the fibers about 50% (based on the dry weight thereof) of a water-insoluble ion-exchange resin having a particle size finer than 325-mesh and evidently largely in the range of 10–40μ. This paper has good anion-exchange properties but is very porous to water.

The paper is impregnated in the gelable solution formed from 190 g. of acrylamide, 10 g. of methylenebisacrylamide, 4 g. of dimethylaminopropionitrile and 5 g. of ammonium persulfate made up as described in Example 1, and the resulting sheet is lightly pressed between two methyl methacrylate plates for 20 minutes.

The product is a flexible, leathery sheet which is impermeable to water but permeable to anions.

I claim:

1. In a gaseous fuel cell composed of electrodes, a membrane and a gas inlet and outlet, the improvement in which said membrane comprises a uniformly hydrophilic, cross-linked, water-insoluble gel of a normally water-soluble, gelable polymer as the matrix, having ion-exchange material, which is different from said gel, occluded therein.

2. In a gaseous fuel cell composed of electrodes, a membrane and a gas inlet and outlet, the improvement in which said membrane comprises a uniformly hydrophilic, water-insoluble gel of polyacrylamide cross-linked with methylenebisacrylamide as the matrix, having a sulfonated styrene-divinyl benzene copolymer cation-exchange resin occluded therein.

References Cited by the Examiner
UNITED STATES PATENTS

| | | | |
|---|---|---|---|
| 2,614,976 | 10/1952 | Patnode et al. | |
| 2,731,411 | 1/1956 | Clarke | 260—2.2 |
| 2,783,212 | 2/1957 | Schnell | 260—2.2 |
| 2,913,511 | 11/1959 | Grubb | 136—86 |

WINSTON A. DOUGLAS, *Primary Examiner.*

JOHN H. MACK, ALLEN B. CURTIS, *Examiners.*

H. FEELEY, *Assistant Examiner.*